(12) United States Patent
Huang

(10) Patent No.: US 8,503,108 B2
(45) Date of Patent: Aug. 6, 2013

(54) PHOTOGRAPHING OPTICAL LENS ASSEMBLY

(75) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 295 days.

(21) Appl. No.: 13/075,194

(22) Filed: Mar. 30, 2011

(65) Prior Publication Data

US 2012/0113310 A1    May 10, 2012

(30) Foreign Application Priority Data

Nov. 9, 2010    (TW) ............... 99138523 A

(51) Int. Cl.
  *G02B 9/34*    (2006.01)
  *G02B 13/00*    (2006.01)
(52) U.S. Cl.
  CPC ............... *G02B 13/004* (2013.01); *G02B 9/34* (2013.01)
  USPC ........................................ 359/715; 359/773

(58) Field of Classification Search
  CPC ............................... G02B 9/34; G02B 13/004
  USPC ......... 359/771–773, 714–715, 766; 348/340
  See application file for complete search history.

(56) References Cited

U.S. PATENT DOCUMENTS 8,289,629 B2 * 10/2012 Uchida ........................ 359/716
2008/0180816 A1 * 7/2008 Nakamura ................... 359/773

FOREIGN PATENT DOCUMENTS

WO    WO 2009136580 A1 * 11/2009

* cited by examiner

*Primary Examiner* — Zachary Wilkes
(74) *Attorney, Agent, or Firm* — CKC & Partners Co., Ltd.

(57) ABSTRACT

A photographing optical lens assembly includes, in order from an object side to an image side: a first lens element with positive refractive power having a convex object-side surface, a second lens element with negative refractive power, a third lens element with positive refractive power having a concave object-side surface and a convex image-side surface, and a fourth lens element with negative refractive power having a concave object-side surface.

13 Claims, 12 Drawing Sheets

PHOTOGRAPHING OPTICAL LENS ASSEMBLY

RELATED APPLICATIONS

The application claims priority to Taiwan Application Serial Number 099138523, filed Nov. 9, 2010, which is herein incorporated by reference.

BACKGROUND

1. Technical Field

The present invention relates to a photographing optical lens assembly. More particularly, the present invention relates to a compact photographing optical lens assembly applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly on a portable electronic product mainly adopts a three-element lens structure, wherein a lens system thereof has a first lens element with positive refractive power, a second lens element with negative refractive power and a third lens element with positive refractive power arranged in order from an object-side to an image-side. However, due to the advancement of the manufacturing technology and the demand for compact camera units on various mobile products, the three-element lens structure cannot produce high quality images.

Further, another conventional compact photographing lens assembly provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated, and it is not easy to attach the glass lenses, and thus the manufacturing process for forming the glass doublet lenses is difficult.

SUMMARY

The present invention provides a photographing optical lens assembly including, in order from an object side to an image side: a first lens element, a second lens element, a third lens element and a fourth lens element. The first lens element with positive refractive power has a convex object-side surface. The second lens element is with negative refractive power. The third lens element with positive refractive power has a concave object-side surface and a convex image-side surface, wherein the third lens element has at least one aspheric surface. The fourth lens element with negative refractive power having a concave object-side surface, wherein at least one of the object-side surface and the image-side surface of the fourth lens element is aspheric. The photographing optical lens assembly has four lens elements with refractive power. A radius of curvature of the object-side surface of the fourth lens element is R7, and a focal length of the photographing optical lens assembly is f, a focal length of the first lens element is f1, and a focal length of the third lens element is f3, a radius of curvature of the object-side surface of the second lens element is R3, and a radius of curvature of the image-side surface of the second lens element is R4. The photographing optical lens assembly includes an aperture stop, wherein a distance on the optical axis between the aperture stop and the image plane is SL, and a distance on the optical axis between the object-side surface of the first lens element and the image plane is TTL. R7, f, f3, R3, R4, SL and TTL satisfy the following relationships:

$-0.5 < R7/f < 0;$ $0.5 < f1/f3 < 1.05;$ $-5.0 < (R3+R4)/(R3-R4) < 0;$ and $0.77 < SL/TTL < 1.1.$ According to another aspect of the present invention, a photographing optical lens assembly includes, in order from an object side to an image side: a first lens element, a second lens element, a third lens element and a fourth lens element. The first lens element with positive refractive power has a convex object-side surface. The second lens element with negative refractive power has a concave object-side surface. The third lens element with positive refractive power has a concave object-side surface and a convex image-side surface. The fourth lens element with negative refractive power has a concave object-side surface and a convex image-side surface, wherein the object-side surface and the image-side surface of the fourth lens element are aspheric. The photographing optical lens assembly has four lens elements with refractive power. A radius of curvature of the object-side surface of the fourth lens element is R7, and a focal length of the photographing optical lens assembly is f, a focal length of the first lens element is f1, and a focal length of the third lens element is f3, and a radius of curvature of the object-side surface of the third lens element is R5, and a radius of curvature of the image-side surface of the third lens element is R6. The photographing optical lens assembly includes an aperture stop, wherein a distance on the optical axis between the aperture stop and the image plane is SL, and a distance on the optical axis between the object-side surface of the first lens element and the image plane is TTL. R7, f, f1, f3, R5, R6, SL and TTL satisfy the following relationships:

$-1.0 < R7/f < 0;$ $0.5 < f1/f3 < 1.05;$ $1.1 < (R5+R6)/(R5-R6) < 5;$ $0.77 < SL/TTL < 1.1.$

DETAILED DESCRIPTION

Figure 1:
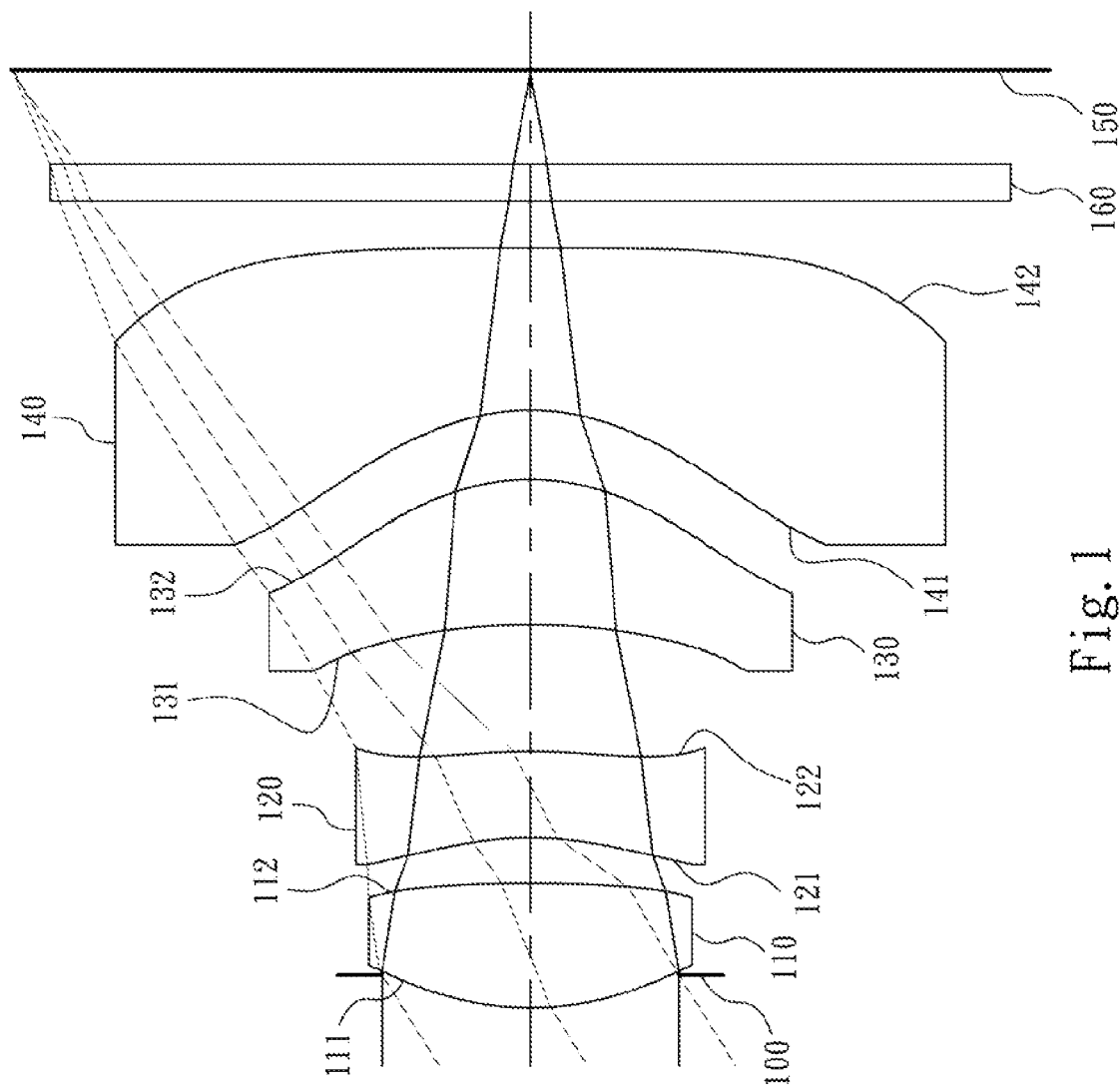
FIG. 1 is a schematic view of a photographing optical lens assembly according to the first embodiment.

A photographing optical lens assembly includes, in order from an object side to an image side, a first lens element, a second lens element, a third lens element and a fourth lens element. The photographing optical lens assembly further includes an image sensor located on an image plane.

The first lens element with positive refractive power provides partial refractive power for reducing the total track length of the photographing optical lens assembly. The first lens element may have a convex object-side surface and a convex image-side surface or a convex object-side surface and a icy concave image-side surface. When the first lens element has a convex object-side surface and a convex image-side surface, the refractive power thereof can be effectively enhanced, thus allowing further reduction of the total track length of the photographing optical lens assembly. When the first lens element has a convex object-side surface and a concave image-side surface, the spherical aberration of the photographing optical lens assembly can be corrected.

The second lens element with negative refractive power can correct the aberration generated from the first lens element and the chromatic aberration within the photographing optical lens assembly. The second lens element may have a concave object-side surface and a concave image-side surface or a concave object-side surface and a convex image-side surface. When the second lens element has a concave object-side surface and a concave image-side surface, the Petzval Sum can be corrected, and the back focal length of the photographing optical lens assembly can be increased for possible additions of other components. When the second lens element has a concave object-side surface and a convex image-side surface, the aberration and the astigmatism of the photographing optical lens assembly can be corrected. Moreover, the second lens element has at least one inflection point formed on at least one of the object-side surface and the image-side surface thereof.

The third lens element has positive refractive power, so that the refractive power of the third lens element can reduce the photosensitivity of the photographing optical lens assembly by providing a partial distribution of the first lens element's refractive power. The third lens element has a concave object-side surface and a convex image-side surface. Thus, the astigmatism of the photographing optical lens assembly can be corrected.

The fourth lens element with negative refractive power can make the principal point of the photographing optical lens assembly positioned away from the image plane, and can advantageously reduce the total track length of the photographing optical lens assembly, so as to maintain the compact size of the photographing optical lens assembly. Moreover, the fourth lens element has at least one inflection point formed on at least one of the object-side surface and the image-side surface thereof.

A radius of curvature of the object-side surface of the fourth lens element is R7, and a focal length of the photographing optical lens assembly is f, and R7 and f satisfy the following relationship:

$$-0.5 < R7/f < 0.$$

Therefore, the fourth lens element can be manufactured and installed easier by the curvature of the fourth lens element, and the higher order aberration of the photographing optical lens assembly can be corrected.

R7 and f can further satisfy the following relationship:

$$-1.0 < R7/f < 0.$$

Moreover, R7 and f can yet satisfy the following relationship:

$$-0.4 < R7/f < -0.17.$$

A focal length of the first lens element is f1, and a focal length of the third lens element is f3, and f1 and f3 satisfy the following relationship:

$$0.5 < f1/f3 < 1.05.$$

Therefore, the distribution of the refractive power of the first lens element can be controlled for reducing the photosensitivity of the photographing optical lens assembly.

f1 and f3 can further satisfy the following relationship:

$$0.7 < f1/f3 < 1.0.$$

A radius of curvature of the object-side surface of the second lens element is R3, and a radius of curvature of the image-side surface of the second lens element is R4, and R3 and R4 satisfy the following relationship:

$$-5.0 < (R3+R4)/(R3-R4) < 0.$$

When the above relation is satisfied, the aberration of the first lens element can be corrected. Moreover, the refractive power of the second lens element can be balanced for avoiding producing too much higher order aberration.

R3 and R4 can further satisfy the following relationship:

$$-3.3 < (R3+R4)/(R3-R4) < -0.7.$$

The photographing optical lens assembly further includes an aperture stop, wherein a distance on the optical axis between the aperture stop and the image plane is SL, and a distance on the optical axis between the object-side surface of the first lens element and the image plane is TTL, and SL and TTL satisfy the following relationship:

$$0.77 < SL/TTL < 1.1.$$

When the SL/TTL<0.77, the angle of incidence on the image sensor would be too large, which will cause poor photographic performance of the image sensor as well as too much chromatic aberration within the photographing optical lens assembly. When the SL/TTL>1.1, the total track length of the photographing optical lens assembly would be too long. Therefore, when SL/TTL satisfies the above relationship, the photographing optical lens assembly has the telecentric characteristic, and a desirable total track length of the photographing optical lens assembly can be maintained.

SL and TTL can further satisfy the following relationship:

$$0.92<SL/TTL<1.1.$$

A radius of curvature of the object-side surface of the third lens element is R5, and a radius of curvature of the image-side surface of the third lens element is R6, and R5 and R6 satisfy the following relationship:

$$1.1<(R5+R6)/(R5-R6)<5.0.$$

Therefore, the curvature of the third lens element can further correct the astigmatism of the photographing optical lens assembly.

The focal length of the photographing optical lens assembly is f, and the focal length of the first lens element is f1, and f and f1 satisfy the following relationship:

$$1.3<f/f1<2.2.$$

When the above relation is satisfied, the distribution of the refractive power of the first lens element is balanced for effectively controlling the total track length of the photographing optical lens assembly and preventing the higher order spherical aberration.

A radius of curvature of the object-side surface of the first lens element is R1, and a radius of curvature of the image-side surface of the first lens element is R2, and R1 and R2 satisfy the following relationship:

$$0<|R1/R2|<0.55.$$

Therefore, the spherical aberration of the photographing optical lens assembly can be corrected. Moreover, the total track length of the photographing optical lens assembly can be effectively reduced by the first lens element.

R1 and R2 can further satisfy the following relationship:

$$0<|R1/R2|<0.35.$$

The focal length of the photographing optical lens assembly is f, and the focal length of the fourth lens element is f4, and f and f4 satisfying the following relationship:

$$-2.5<f/f4<-1.5.$$

Therefore, the principal point of the photographing optical lens assembly can be positioned away from the image plane, and the total track length of the photographing optical lens assembly can be reduced, so as to maintain the compact size of the photographing optical lens assembly.

The Abbe number of the first lens element is V1, and the Abbe number of the second lens element is V2, and V1 and V2 satisfy the following relationship:

$$29<V1-V2<42.$$

Therefore, the chromatic aberration of the photographing optical lens assembly can be corrected.

The focal length of the photographing optical lens assembly is f, and a focal length of the second lens element is f2, and f and f2 satisfy the following relationship:

$$-0.75<f/f2<-0.4.$$

Therefore, the aberration of the first lens element and the chromatic aberration of the photographing optical lens assembly can be corrected by the refractive power of the second lens element.

A half of a diagonal length of an effective sensing area of the image sensor is ImgH, and the distance on the optical axis between the object-side surface of the first lens element and the image plane is TTL, and ImgH and TTL satisfy the following relationship:

$$TTL/ImgH<1.95.$$

When the above relation is satisfied, the total track length of the photographing optical lens assembly can be reduced, so as to maintain the compact size of the photographing optical lens assembly for applications on lightweight and portable electronic products.

According to the photographing optical lens assembly of the present invention, the lens element can be made of glass material or plastic material. When the lens element is made of glass material, the distribution of degree of freedom of the refractive power of the photographing optical lens assembly can be increased. When the lens element is made of plastic material, the cost of manufacture can be effectively reduced. Besides, the surface of the lens element can be aspheric, so as to make the surface into other shape except spherical easier for obtaining more controllable variable, reducing aberration and amount of the lens element. Therefore, the total track length of the photographing optical lens assembly can be reduced.

According to the photographing optical lens assembly of the present invention, the lens element has a convex surface representing the paraxial region of the surface is convex, and the lens element has a concave surface representing the paraxial region of the surface is concave.

According to the photographing optical lens assembly of the present invention, the photographing optical lens assembly can include at least one diaphragm for reducing stray light while retaining high image quality.

According to the above description of the present invention, the following 1st-6th specific embodiments are provided for further explanation.

Figure 2:
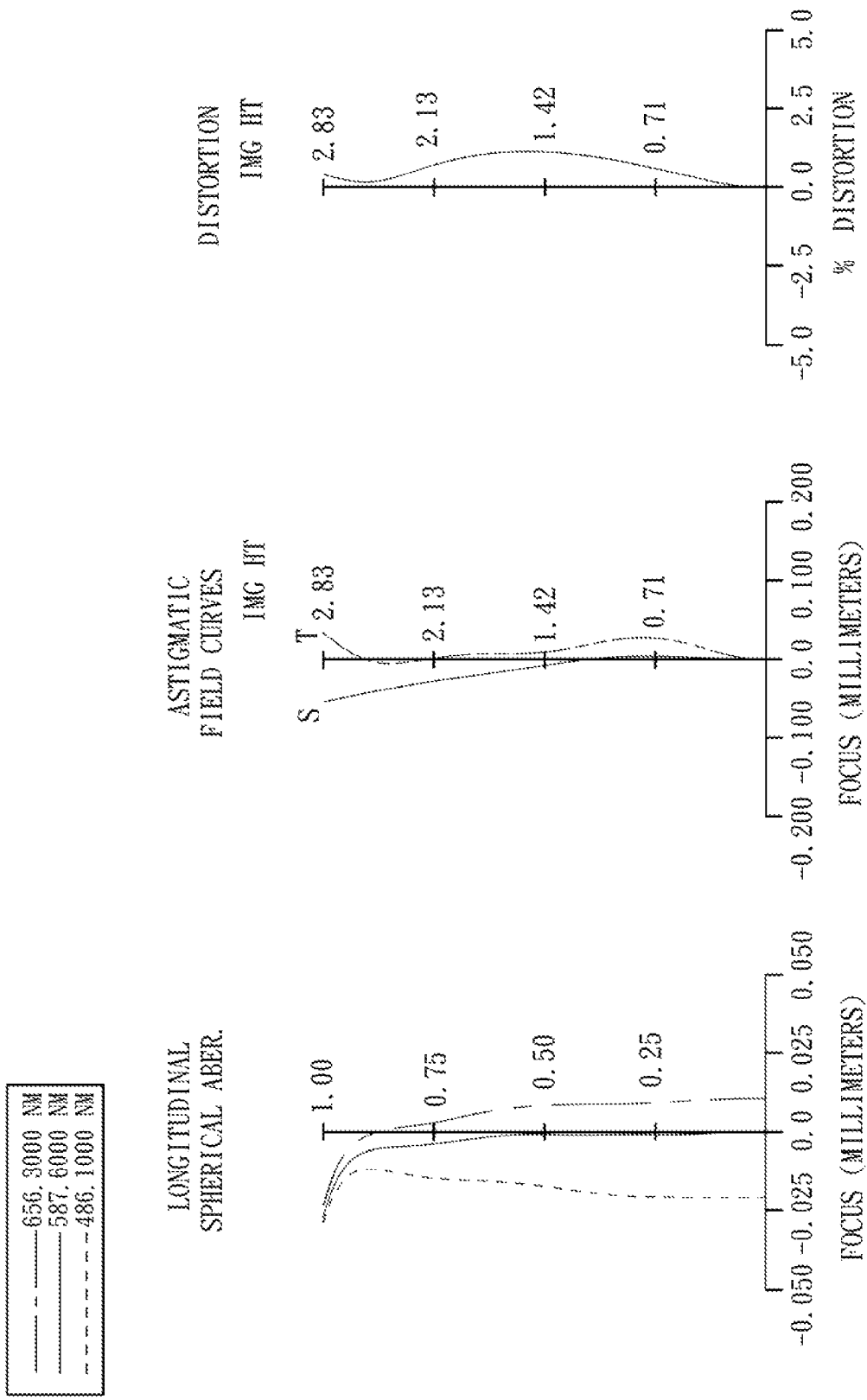
FIG. 2 shows spherical aberration curves, astigmatic field curves and distortion curve of the photographing optical lens assembly according to the first embodiment.

FIG. 1 is a schematic view of a photographing optical lens assembly according to the first embodiment. FIG. 2 shows spherical aberration curves, astigmatic field curves and distortion curve of the photographing optical lens is assembly according to the first embodiment. In FIG. 1, the photographing optical lens assembly includes, in order from an object side to an image side, an aperture stop 100, the first lens element 110, the second lens element 120, the third lens element 130, the fourth lens element 140, an IR (infrared) cut filter 160 and an image plane 150.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric.

The second lens element 120 is made of plastic material. The second lens element 120 with negative refractive power has a concave object-side surface 121 and a convex image-side surface 122. The object-side surface 121 and the image-side surface 122 of the second lens element 120 are aspheric.

The third lens element 130 is made of plastic material. The third lens element 130 with positive refractive power has a concave object-side surface 131 and a convex image-side surface 132. The object-side surface 131 and the image-side surface 132 of the third lens element 130 are aspheric.

The fourth lens element 140 is made of plastic material. The fourth lens element 140 with negative refractive power has a concave object-side surface 141 and a convex image-side surface 142. The object-side surface 141 and the image-side surface 142 of the fourth lens element 140 are aspheric.

The IR cut filter 160 is located between the fourth lens element 140 and the image plane 150 and will not affect the focal length of the photographing optical lens assembly.

The equation of the aspheric surface profiles of the aforementioned lens elements of the first embodiment is expressed as follows:

$$X(Y) = (Y^2/R)/(1 + \text{sqrt}(1-(1+k)\times(Y/R)^2)) + \sum_i (Ai)\times(Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the photographing optical lens assembly according to the first embodiment, f is a focal length of the photographing optical lens assembly, Fno is an f-number of the photographing optical lens assembly, HFOV is half of the maximal field of view, and they satisfy the following relationships:

$f$=4.52 mm;

$Fno$=2.77; and $HFOV$=32.1 degrees.

In the photographing optical lens assembly according to the first embodiment, V1 is the Abbe number of the first lens element 110, V2 is the Abbe number of the second lens element 120, and they satisfy the following relationship:

$V1-V2$=32.1.

In the photographing optical lens assembly according to the first embodiment, R1 is a radius of curvature of the object-side surface 111 of the first lens element 110, R2 is a radius of curvature of the image-side surface 112 of the first lens element 110, R3 is a radius of curvature of the object-side surface 121 of the second lens element 120, R4 is a radius of curvature of the image-side surface 122 of the second lens element 120, R5 is a radius of curvature of the object-side surface 131 of the third lens element 130, R6 is a radius of curvature of the image-side surface 132 of the third lens element 130, and they satisfy the following relationships:

$|R1/R2|$=0.21;

$(R3+R4)/(R3-R4)$=−3.17; and $(R5+R6)/(R5-R6)$=2.07.

In the photographing optical lens assembly according to the first embodiment, R7 is a radius of curvature of the object-side surface 141 of the fourth lens element 140, f is the focal length of the photographing optical lens assembly, and they satisfy the following relationship:

$R7/f$=−0.27.

In the photographing optical lens assembly according to the first embodiment, f is the focal length of the photographing optical lens assembly, f1 is a focal length of the first lens element 110, f2 is a focal length of the second lens element 120, f3 is a focal length of the third lens element 130, f4 is a focal length of the fourth lens element 140, and they satisfy the following relationships:

$f/f1$=1.73;

$f/f2$=−0.69;

$f/f4$=−1.94; and $f1/f3$=0.82.

In the photographing optical lens assembly according to the first embodiment, SL is a distance on the optical axis between the aperture stop 100 and the image plane 150, TTL is a distance on the optical axis between the object-side surface 111 of the first lens element 110 and the image plane 150, and they satisfy the following relationship:

$SL/TTL$=0.97.

In the photographing optical lens assembly according to the first embodiment, the photographing optical lens assembly further includes an image sensor located on the image plane 150, wherein ImgH is a half of a diagonal length of an effective sensing area of the image sensor, TTL is the distance on the optical axis between the object-side surface 111 of the first lens element 110 and the image plane 150, and they satisfy the following relationship:

$TTL/ImgH$=1.79.

The detailed optical data of the first embodiment are shown in Table 1, and the aspheric surface data are shown in Table 2 as follows.

TABLE 1

(Embodiment 1)
f = 4.52 mm, Fno = 2.77, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.180 | | | | |
| 2 | Lens 1 | 1.67278 (ASP) | 0.682 | Plastic | 1.544 | 55.9 | 2.61 |
| 3 | | −8.05930 (ASP) | 0.251 | | | | |
| 4 | Lens 2 | −1.76465 (ASP) | 0.473 | Plastic | 1.634 | 23.8 | −6.55 |
| 5 | | −3.38750 (ASP) | 0.695 | | | | |
| 6 | Lens 3 | −3.54690 (ASP) | 0.798 | Plastic | 1.530 | 55.8 | 3.20 |
| 7 | | −1.23669 (ASP) | 0.384 | | | | |
| 8 | Lens 4 | −1.22091 (ASP) | 0.887 | Plastic | 1.530 | 55.8 | −2.33 |
| 9 | | −150.46750 (ASP) | 0.260 | | | | |
| 10 | IR-filter | Plano | 0.200 | Glass | 1.517 | 64.2 | — |
| 11 | | Plano | 0.519 | | | | |
| 12 | Image | Plano | — | | | | |

Note:
Reference wavelength (d-line) is 587.6 nm

TABLE 2

| Aspheric Coefficients | | | | |
|---|---|---|---|---|
| Surface # | 2 | 3 | 4 | 5 |
| k= | −9.25760E−01 | −8.40624E+00 | −9.97923E−01 | −8.46317E−02 |
| A4= | 1.49475E−02 | −9.64762E−03 | 1.91037E−01 | 2.10949E−01 |
| A6= | −9.92941E−03 | −2.62043E−02 | −1.22388E−01 | −3.00769E−02 |
| A8= | 1.52295E−02 | −2.03315E−02 | 3.66746E−02 | −4.02428E−02 |
| A10= | −4.12073E−02 | −1.33917E−02 | 1.00499E−02 | 4.82366E−02 |
| A12= | 8.56624E−09 | 6.09986E−09 | 6.14403E−09 | 1.70368E−03 |
| Surface # | 6 | 7 | 8 | 9 |
| k= | 2.53115E+00 | −1.01438E+00 | −9.52972E−01 | 1.78952E+02 |
| A4= | −1.03713E−03 | 2.30264E−02 | 3.31560E−02 | −1.34436E−02 |
| A6= | −6.02191E−03 | −2.29706E−02 | 4.92190E−03 | −4.00758E−04 |
| A8= | 9.84694E−03 | 3.40640E−02 | 3.20074E−03 | −1.50150E−04 |
| A10= | −6.57267E−03 | −8.39133E−03 | −8.75061E−04 | 4.98500E−06 |
| A12= | −1.79854E−03 | 7.53163E−05 | −5.93557E−06 | 3.23080E−07 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th. All labels for Tables of the remaining embodiments share the same definitions as those in Table 1 and Table 2 of the first embodiment, and their definitions will not be stated again.

Figure 3:
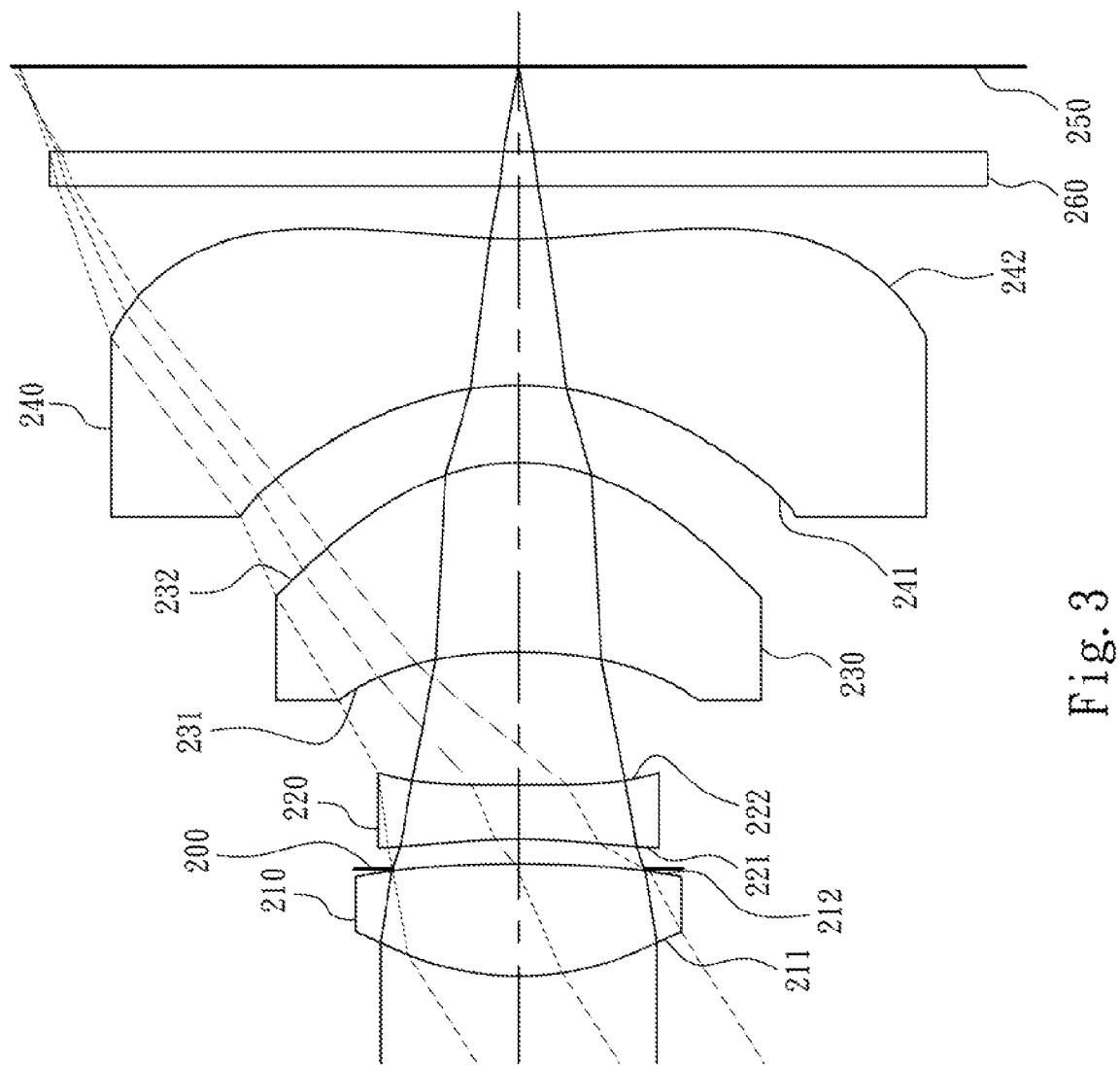
FIG. 3 is a schematic view of a photographing optical lens assembly according to the second embodiment.
Figure 4:
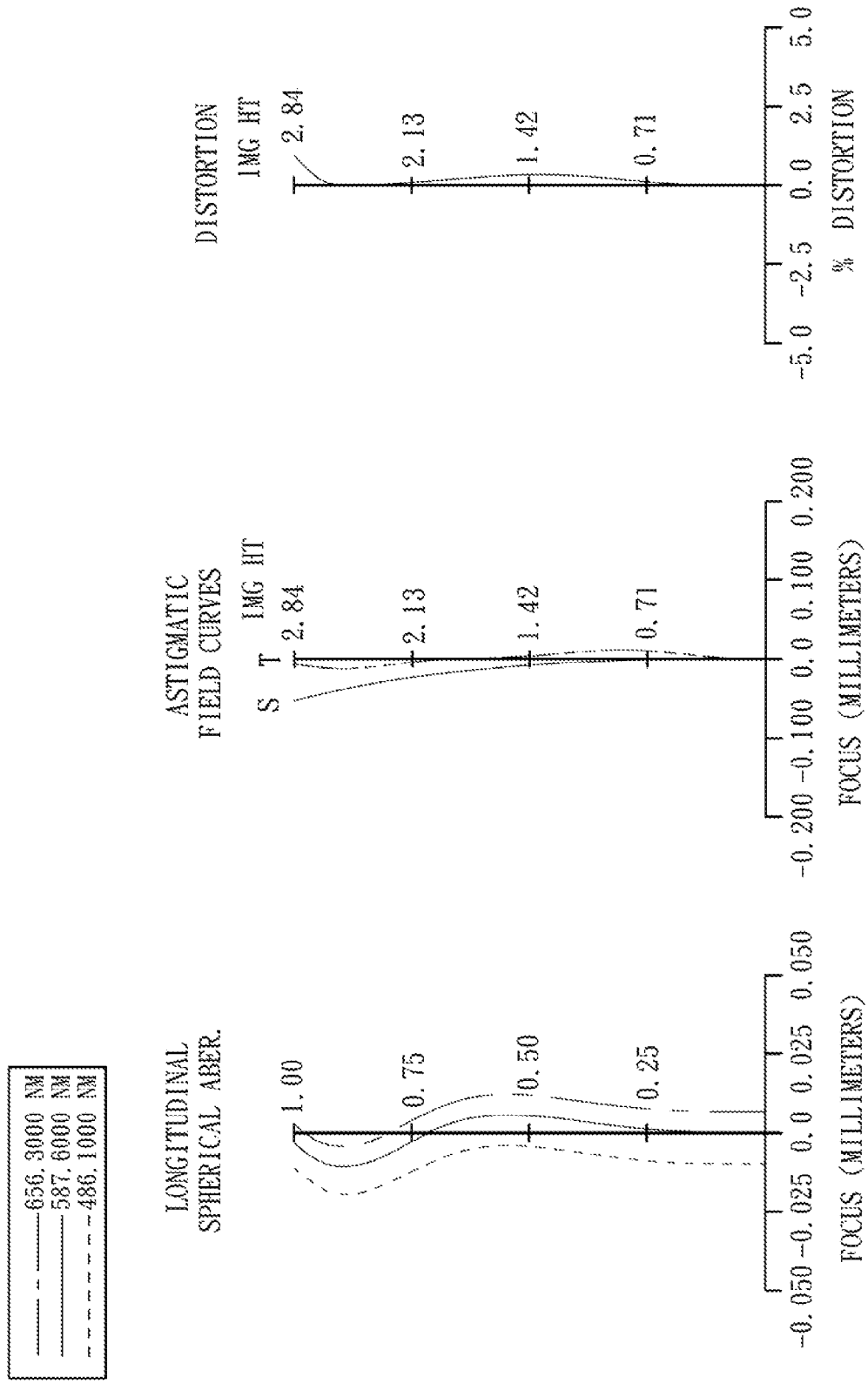
FIG. 4 shows spherical aberration curves, astigmatic field curves and distortion curve of the photographing optical lens assembly according to the second embodiment.

FIG. 3 is a schematic view of a photographing optical lens assembly according to the second embodiment. FIG. 4 shows spherical aberration curves, astigmatic field curves and distortion curve of the photographing optical lens assembly according to the second embodiment. In FIG. 3, the photographing optical lens assembly includes, in order from an object side to an image side, the first lens element 210, an aperture stop 200, the second lens element 220, the third lens element 230, the fourth lens element 240, an IR (infrared) cut filter 260 and an image plane 250.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with negative refractive power has a concave object-side surface 221 and a concave image-side surface 222. The object-side surface 221 and the image-side surface 222 of the second lens element 220 are aspheric.

The third lens element 230 is made of plastic material. The third lens element 230 with positive refractive power has a concave object-side surface 231 and a convex image-side surface 232. The object-side surface 231 and the image-side surface 232 of the third lens element 230 are aspheric.

The fourth lens element 240 is made of plastic material. The fourth lens element 240 with negative refractive power has a concave object-side surface 241 and a concave image-side surface 242. The object-side surface 241 and the image-side surface 242 of the fourth lens element 240 are aspheric.

The IR cut filter 260 is located between the fourth lens element 240 and the image plane 250 and will not affect the focal length of the photographing optical lens assembly.

The equation of the aspheric surface profiles of the above lens elements of the second embodiment is the same as that of the first embodiment, and will not be stated herein again.

In the photographing optical lens assembly according to the second embodiment, the definitions of f, Fno, HFOV, V1, V2, R1, R2, R3, R4, R5, R6, R7, f1, f2, f3, f4, SL, TTL and ImgH are the same as those stated in the first embodiment with corresponding values for the second embodiment, and they satisfy the following relationships:

| | |
|---|---|
| f(mm) | 4.47 |
| Fno | 2.85 |
| HFOV(degrees) | 32.3 |
| V1 − V2 | 32.1 |
| |R1/R2| | 0.25 |
| (R3 + R4)/(R3 − R4) | −0.96 |
| (R5 + R6)/(R5 − R6) | 2.47 |
| R7/f | −0.41 |
| f/f1 | 1.80 |
| f/f2 | −0.91 |
| f/f4 | −1.99 |
| f1/f3 | 0.80 |
| SL/TTL | 0.88 |
| TTL/ImgH | 1.79 |

The detailed optical data of the second embodiment are shown in Table 3, and the aspheric surface data are shown in Table 4 as follows.

TABLE 3

(Embodiment 2)
f = 4.47 mm, Fno = 2.85, HFOV = 32.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.64553 (ASP) | 0.636 | Plastic | 1.544 | 55.9 | 2.48 |
| 2 | | −6.51720 (ASP) | −0.030 | | | | |
| 3 | Ape. Stop | Plano | 0.170 | | | | |
| 4 | Lens 2 | −3.17750 (ASP) | 0.304 | Plastic | 1.634 | 23.8 | −4.92 |

TABLE 3-continued (Embodiment 2)
f = 4.47 mm, Fno = 2.85, HFOV = 32.3 deg.

| Surface # | | Curvature Radius | Thickness | Material | Index | Abbe # | Focal length |
|---|---|---|---|---|---|---|---|
| 5 | | 171.30750 (ASP) | 0.752 | | | | |
| 6 | Lens 3 | −2.76271 (ASP) | 1.076 | Plastic | 1.530 | 55.8 | 3.10 |
| 7 | | −1.16987 (ASP) | 0.434 | | | | |
| 8 | Lens 4 | −1.84181 (ASP) | 0.828 | Plastic | 1.530 | 55.8 | −2.25 |
| 9 | | 3.92690 (ASP) | 0.300 | | | | |
| 10 | IR-filter | Plano | 0.200 | Glass | 1.517 | 64.2 | — |
| 11 | | Plano | 0.476 | | | | |
| 12 | Image | Plano | — | | | | |

Note:
Reference wavelength (d-line) is 587.6 nm

TABLE 4

Aspheric Coefficients

| Surface # | 1 | 2 | 4 | 5 |
|---|---|---|---|---|
| k= | −8.97968E−01 | −5.06765E+01 | −2.15932E+00 | −1.00000E+00 |
| A4= | 1.58431E−02 | 2.20236E−03 | 1.94649E−01 | 1.96484E−01 |
| A6= | −1.81928E−02 | −3.49230E−02 | −1.27372E−01 | −5.53433E−02 |
| A8= | 1.59594E−02 | −3.13354E−02 | 6.65431E−03 | −3.01046E−02 |
| A10= | −1.60985E−02 | −2.94984E−02 | −1.62836E−02 | 7.94871E−02 |
| A12= | −3.79750E−02 | 2.01139E−02 | 6.66066E−02 | −1.10224E−02 |

| Surface # | 6 | 7 | 8 | 9 |
|---|---|---|---|---|
| k= | 4.22691E+00 | −1.07163E+00 | −4.18596E−01 | −3.81489E+01 |
| A4= | −4.08092E−02 | 2.14362E−02 | −1.78273E−03 | −3.17594E−02 |
| A6= | 2.81121E−03 | −3.90397E−02 | 3.41486E−03 | 3.19805E−03 |
| A8= | 1.25572E−02 | 2.87483E−02 | 5.17681E−03 | −4.50188E−04 |
| A10= | −4.21877E−03 | −8.25630E−03 | −1.17699E−03 | 3.64993E−05 |
| A12= | 3.05874E−03 | 1.05839E−03 | −4.56700E−04 | −9.79651E−06 |

Figure 5:
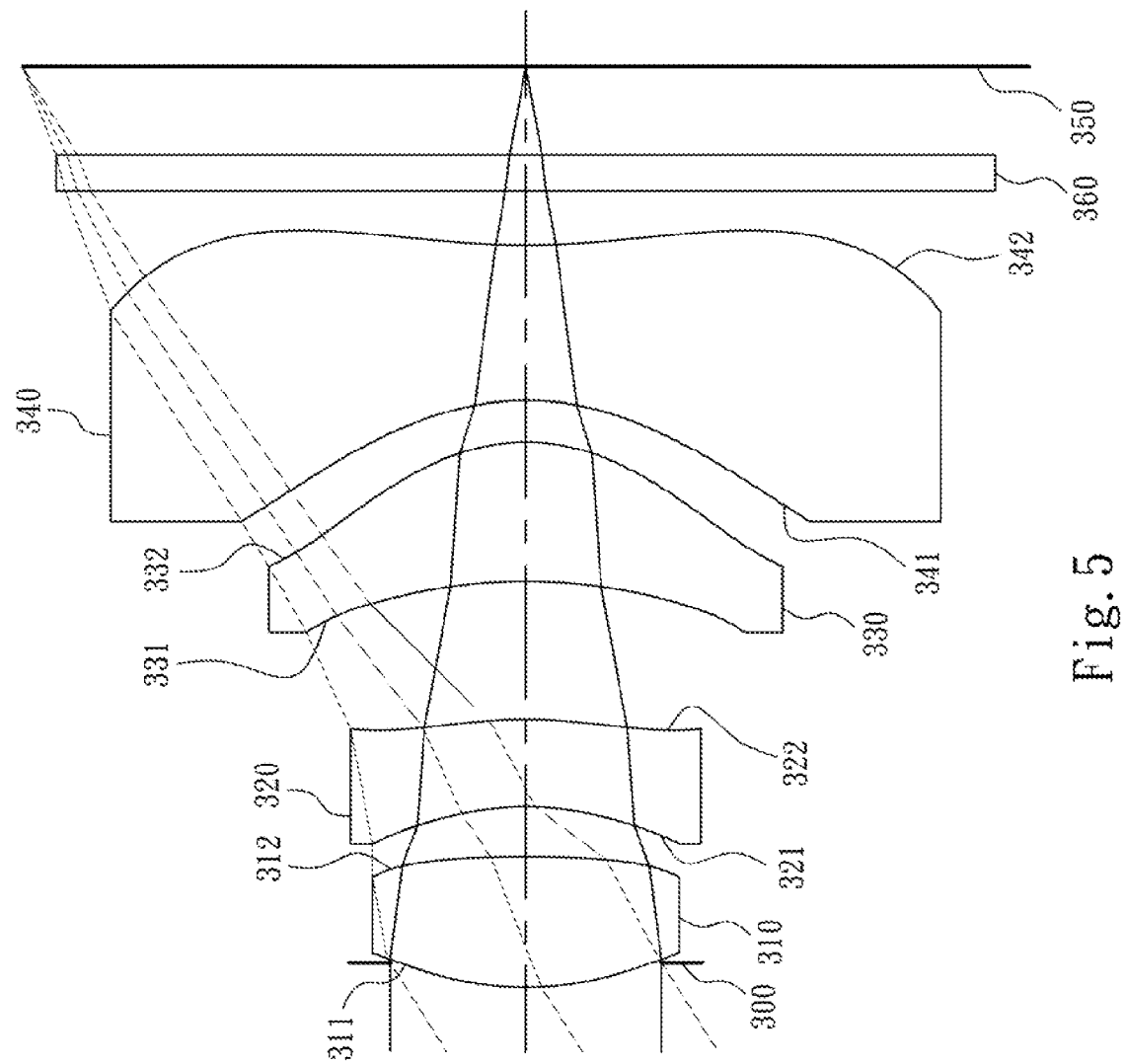
FIG. 5 is a schematic view of a photographing optical lens assembly according to the third embodiment.
Figure 6:
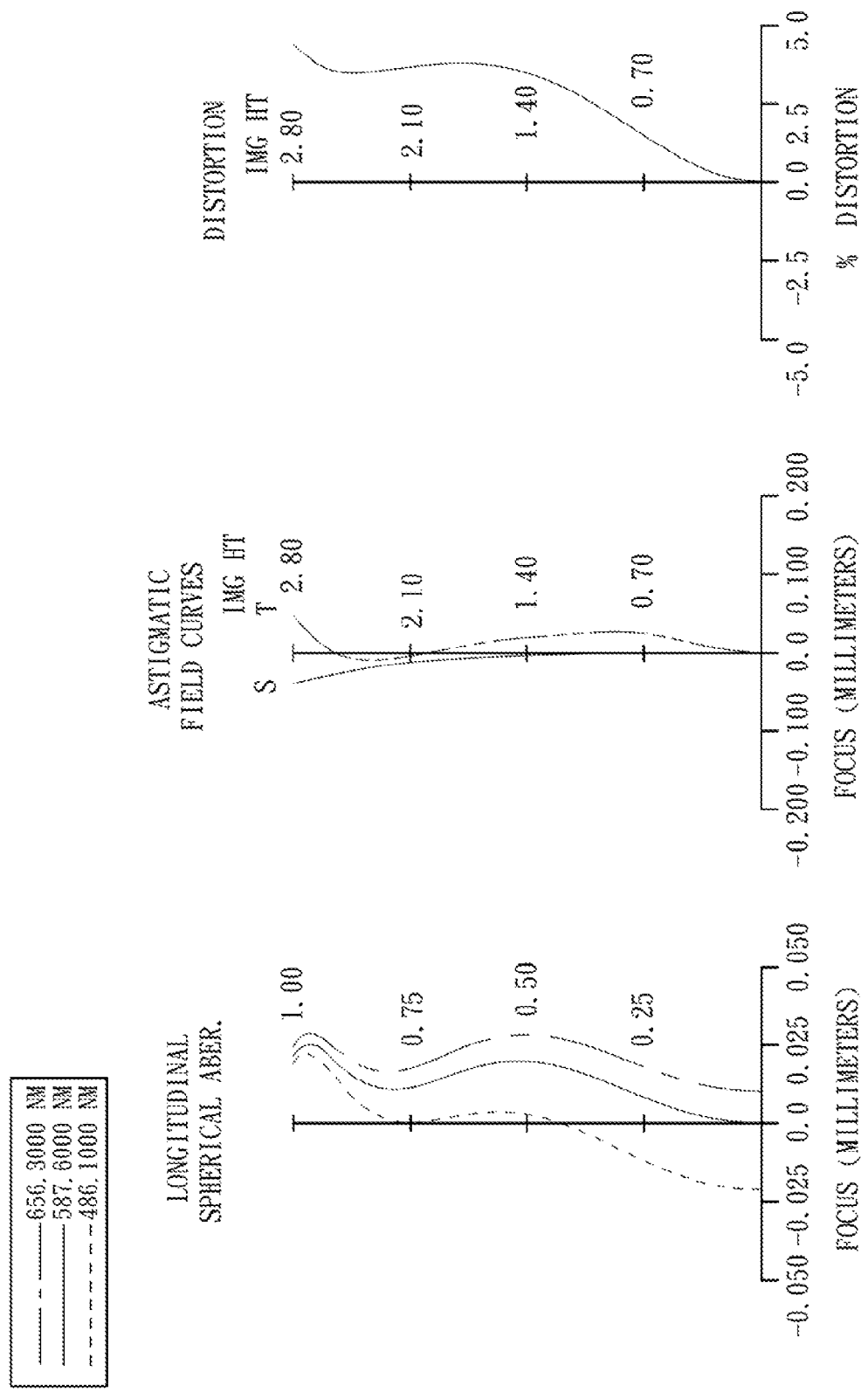
FIG. 6 shows spherical aberration curves, astigmatic field curves and distortion curve of the photographing optical lens assembly according to the third embodiment.

FIG. 5 is a schematic view of a photographing optical lens assembly according to the third embodiment. FIG. 6 shows spherical aberration curves, astigmatic field curves and distortion curve of the photographing optical lens assembly according to the third embodiment. In FIG. 5, the photographing optical lens assembly includes, in order from an object side to an image side, an aperture stop 300, the first lens element 310, the second lens element 320, the in third lens element 330, the fourth lens element 340, an IR (infrared) cut filter 360 and an image plane 350.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric.

The second lens element 320 is made of plastic material. The second lens element 320 with negative refractive power has a concave object-side surface 321 and a convex image-side surface 322. The object-side surface 321 and the image-side surface 322 of the second lens element 320 are aspheric.

The third lens element 330 is made of plastic material. The third lens element 330 with positive refractive power has a concave object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a concave object-side surface 341 and a concave image-side surface 342. The object-side surface 341 and the image-side surface 342 of the fourth lens element 340 are aspheric.

The IR cut filter 360 is located between the fourth lens element 340 and the image plane 350 and will not affect the focal length of the photographing optical lens assembly.

The equation of the aspheric surface profiles of the above lens elements of the third embodiment is the same as that of the first embodiment, and will not be stated herein again.

In the photographing optical lens assembly according to the third embodiment, the definitions of f, Fno, HFOV, V1, V2, R1, R2, R3, R4, R5, R6, R7, f1, f2, f3, f4, SL, TTL and ImgH are the same as those stated in the first embodiment with corresponding values for the third embodiment, and they satisfy the following relationships:

| | |
|---|---|
| f(mm) | 4.28 |
| Fno | 2.80 |
| HFOV(degrees) | 32.3 |
| V1 − V2 | 32.5 |
| \|R1/R2\| | 0.28 |
| (R3 + R4)/(R3 − R4) | −4.02 |
| (R5 + R6)/(R5 − R6) | 2.09 |
| R7/f | −0.37 |
| f/f1 | 1.63 |
| f/f2 | −0.57 |
| f/f4 | −2.09 |
| f1/f3 | 0.99 |
| SL/TTL | 0.97 |
| TTL/ImgH | 1.81 |

The detailed optical data of the third embodiment are shown in Table 5, and the aspheric surface data are shown in Table 6 as follows.

TABLE 5

(Embodiment 3)
f = 4.28 mm, Fno = 2.80, HFOV = 32.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.140 | | | | |
| 2 | Lens 1 | 1.77130 (ASP) | 0.729 | Plastic | 1.544 | 55.9 | 2.63 |
| 3 | | −6.33670 (ASP) | 0.281 | | | | |
| 4 | Lens 2 | −1.53558 (ASP) | 0.483 | Plastic | 1.632 | 23.4 | −7.47 |
| 5 | | −2.55286 (ASP) | 0.770 | | | | |
| 6 | Lens 3 | −2.95410 (ASP) | 0.779 | Plastic | 1.530 | 55.8 | 2.67 |
| 7 | | −1.04390 (ASP) | 0.230 | | | | |
| 8 | Lens 4 | −1.54899 (ASP) | 0.868 | Plastic | 1.530 | 55.8 | −2.05 |
| 9 | | 4.34150 (ASP) | 0.300 | | | | |
| 10 | IR-filter | Plano | 0.200 | Glass | 1.517 | 64.2 | — |
| 11 | | Plano | 0.490 | | | | |
| 12 | Image | Plano | — | | | | |

Note:
Reference wavelength (d-line) is 587.6 nm

TABLE 6

Aspheric Coefficients

| Surface # | 2 | 3 | 4 | 5 |
|---|---|---|---|---|
| k= | −1.11865E−00 | 1.93334E+01 | −5.36711E−01 | 4.91321E−01 |
| A4= | 1.02205E−02 | −1.30168E−02 | 1.74645E−01 | 2.05751E−01 |
| A6= | −9.26894E−03 | −8.84014E−02 | −1.43778E−01 | −4.33389E−02 |
| A8= | 1.32962E−02 | −1.26382E−02 | −7.01295E−02 | −5.05098E−02 |
| A10= | −7.60345E−02 | −2.96408E−02 | 9.44041E−02 | 4.97693E−02 |
| A12= | −5.37788E−06 | −8.38700E−06 | −7.96632E−06 | 3.48079E−05 |

| Surface # | 6 | 7 | 8 | 9 |
|---|---|---|---|---|
| k= | 1.42542E+00 | −1.19917E+00 | −7.45480E−01 | −1.00000E+00 |
| A4= | 1.07991E−02 | 3.61604E−02 | 1.63200E−02 | −4.79877E−02 |
| A6= | 3.32142E−03 | −2.41337E−02 | 1.37699E−03 | 6.40746E−03 |
| A8= | 6.84690E−03 | 3.01002E−02 | 4.48648E−03 | −9.29192E−04 |
| A10= | −8.04424E−03 | −8.22555E−03 | −1.04637E−03 | 4.21825E−05 |
| A12= | −9.68274E−04 | 4.38331E−04 | −6.72601E−06 | −9.10855E−07 |

Figure 7:
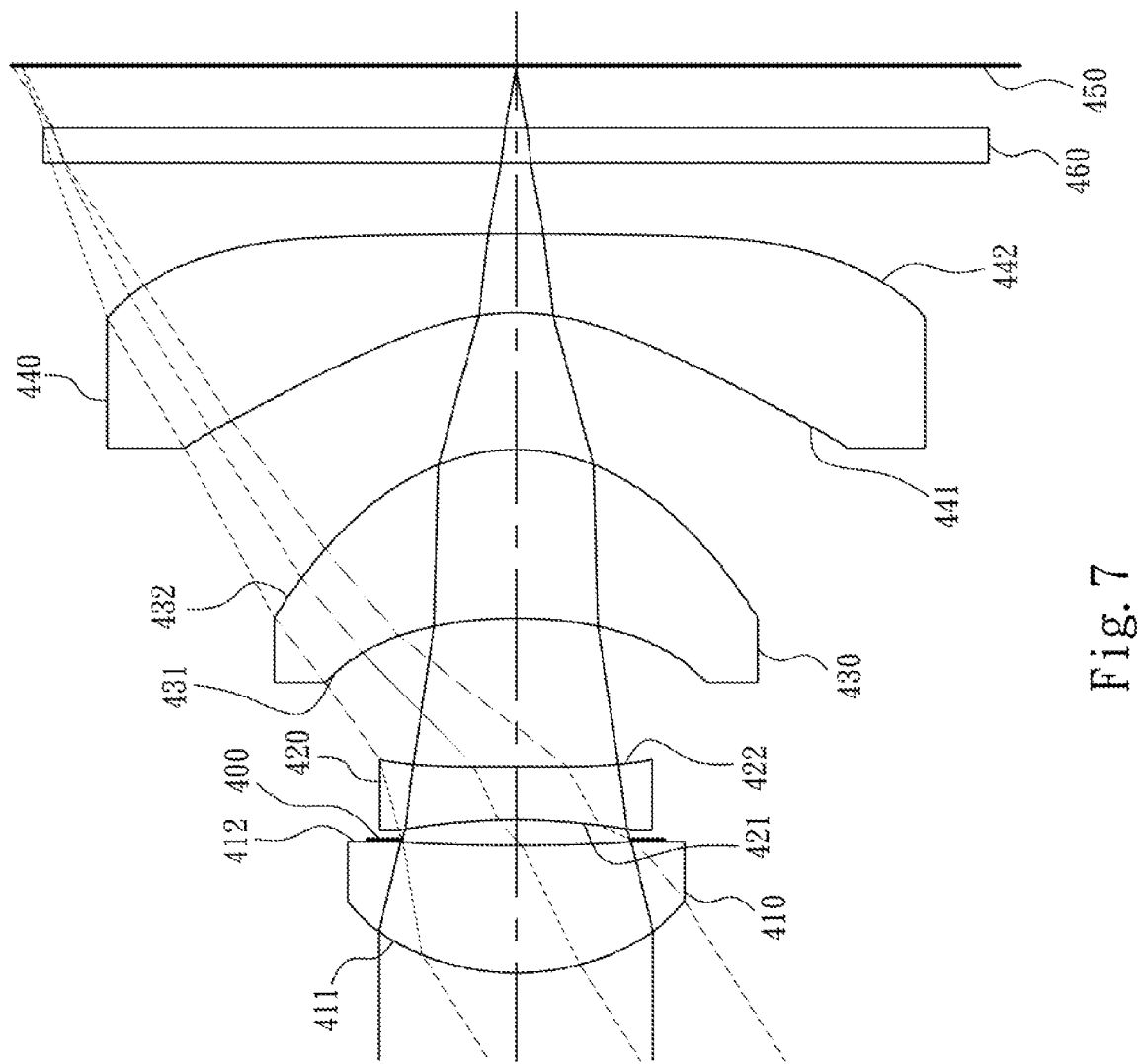
FIG. 7 is a schematic view of a photographing optical lens assembly according to the fourth embodiment.
Figure 8:
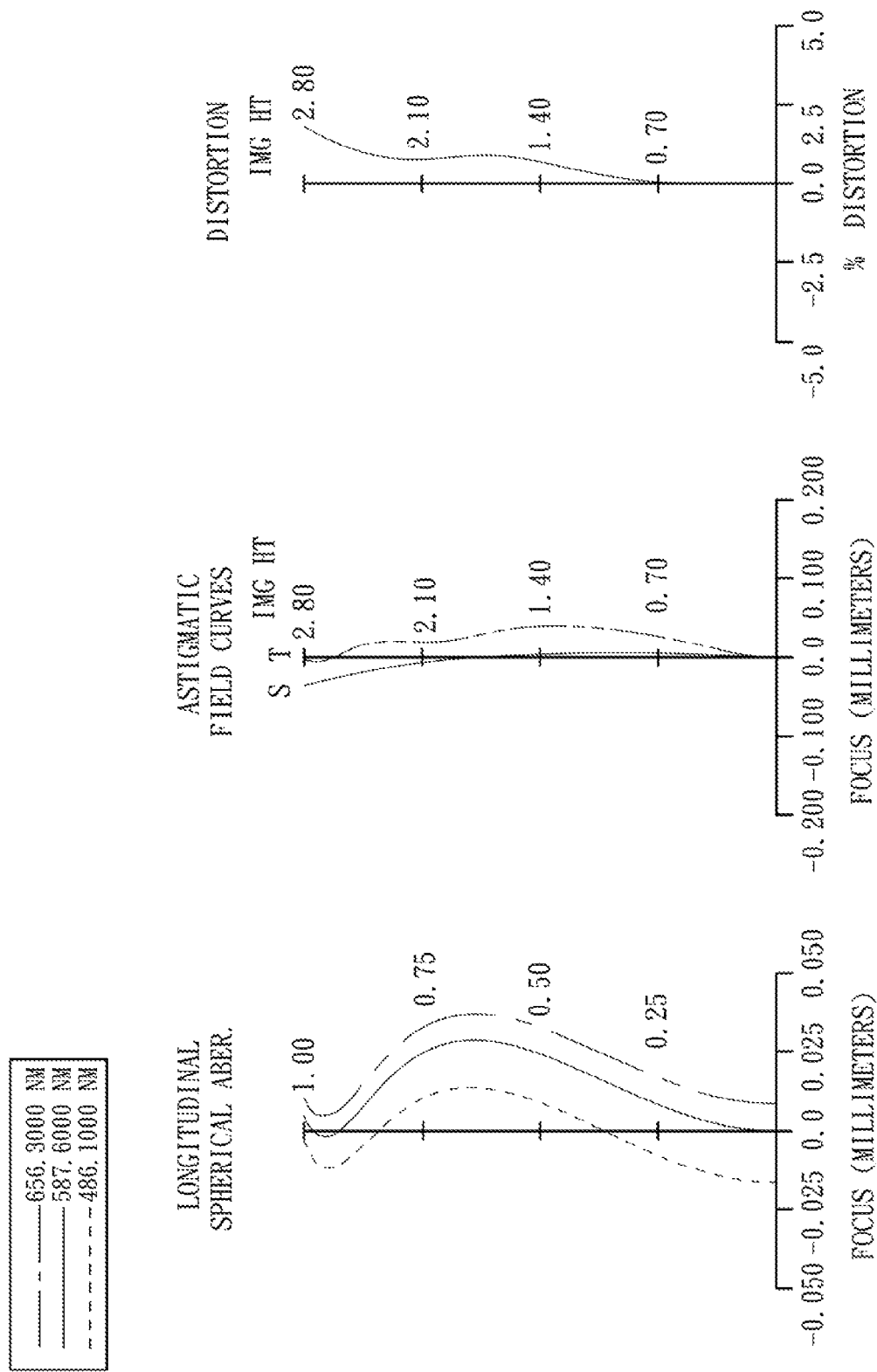
FIG. 8 shows spherical aberration curves, astigmatic field curves and distortion curve of the photographing optical lens assembly according to the fourth embodiment.

FIG. 7 is a schematic view of a photographing optical lens assembly according to the fourth embodiment. FIG. 8 shows spherical aberration curves, astigmatic field curves and distortion curve of the photographing optical lens assembly according to the fourth embodiment. In FIG. 7, the photographing optical lens assembly includes, in order from an object side to an image side, the first lens element 410, an aperture stop 400, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric.

The second lens element 420 is made of plastic material. The second lens element 420 with negative refractive power has a concave object-side surface 421 and a convex image-side surface 422. The object-side surface 421 and the image-side surface 422 of the second lens element 420 are aspheric.

The third lens element 430 is made of plastic material. The third lens element 430 with positive refractive power has a concave object-side surface 431 and a convex image-side surface 432. The object-side surface 431 and the image-side surface 432 of the third lens element 430 are aspheric.

The fourth lens element 440 is made of plastic material. The fourth lens element 440 with negative refractive power has a concave object-side surface 441 and a convex image-side surface 442. The object-side surface 441 and the image-side surface 442 of the fourth lens element 440 are aspheric.

The IR cut filter 460 is located between the fourth lens element 440 and the image plane 450 and will not affect the focal length of the photographing optical lens assembly.

The equation of the aspheric surface profiles of the above lens elements of the fourth embodiment is the same as that of the first embodiment, and will not be stated herein again.

In the photographing optical lens assembly according to the fourth embodiment, the definitions of f, Fno, HFOV, V1, V2, R1, R2, R3, R4, R5, R6, R7, f1, f2, f3, f4, SL, TTL and ImgH are the same as those stated in the first embodiment with corresponding values for the fourth embodiment, and they satisfy the following relationships:

| f(mm) | 4.39 |
|---|---|
| Fno | 2.80 |
| HFOV(degrees) | 32.2 |
| V1 − V2 | 32.5 |
| |R1/R2| | 0.06 |

-continued

| | |
|---|---|
| (R3 + R4)/(R3 − R4) | −1.20 |
| (R5 + R6)/(R5 − R6) | 2.33 |
| R7/f | −0.30 |
| f/f1 | 1.52 |
| f/f2 | −0.84 |
| f/f4 | −1.68 |
| f1/f3 | 0.98 |
| SL/TTL | 0.85 |
| TTL/ImgH | 1.81 |

The detailed optical data of the fourth embodiment are shown in Table 7, and the aspheric surface data are shown in Table 8 as follows.

TABLE 7

(Embodiment 4)
f = 4.39 mm, Fno = 2.80, HFOV = 32.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.46689 (ASP) | 0.726 | Plastic | 1.535 | 56.3 | 2.88 |
| 2 | | 25.00000 (ASP) | 0.035 | | | | |
| 3 | Ape. Stop | Plano | 0.110 | | | | |
| 4 | Lens 2 | −2.99571 (ASP) | 0.300 | Plastic | 1.634 | 23.8 | −5.21 |
| 5 | | −33.33330 (ASP) | 0.837 | | | | |
| 6 | Lens 3 | −2.74140 (ASP) | 0.963 | Plastic | 1.514 | 56.8 | 2.95 |
| 7 | | −1.09313 (ASP) | 0.774 | | | | |
| 8 | Lens 4 | −1.31159 (ASP) | 0.450 | Plastic | 1.535 | 56.3 | −2.61 |
| 9 | | −25.00000 (ASP) | 0.400 | | | | |
| 10 | IR-filter | Plano | 0.200 | Glass | 1.517 | 64.2 | — |
| 11 | | Plano | 0.350 | | | | |
| 12 | Image | Plano | — | | | | |

Note:
Reference wavelength (d-line) is 587.6 nm

TABLE 8

Aspheric Coefficients

| Surface # | 1 | 2 | 4 | 5 |
|---|---|---|---|---|
| k= | −3.61984E−01 | −1.00000E+00 | 3.30349E−00 | −1.00000E−00 |
| A4= | 3.42755E−02 | 6.45210E−02 | 1.74640E−01 | 1.86713E−01 |
| A6= | 2.87692E−02 | 9.88728E−03 | −1.26049E−01 | −8.86583E−02 |
| A8= | 4.04784E−03 | 2.75501E−02 | −2.02117E−02 | −3.89550E−02 |
| A10= | 3.12562E−02 | −1.98941E−01 | −1.93309E−01 | 7.20529E−02 |
| A12= | 1.12212E−03 | 8.64650E−05 | −2.90911E−04 | 1.72546E−03 |

| Surface # | 6 | 7 | 8 | 9 |
|---|---|---|---|---|
| k= | 2.30381E+00 | −6.43055E−01 | −2.34206E+00 | −1.00000E+00 |
| A4= | −8.13615E−02 | 3.28659E−02 | 5.22533E−02 | 1.29092E−02 |
| A6= | 2.18717E−02 | −2.43856E−02 | −2.94932E−02 | −8.57845E−03 |
| A8= | −2.04512E−03 | 1.91237E−02 | 8.37674E−03 | 1.07337E−04 |
| A10= | −1.99255E−02 | −9.39230E−03 | −7.43132E−04 | 3.02761E−04 |
| A12= | 8.04989E−03 | 2.33737E−03 | −4.85361E−05 | −3.56837E−05 |

Figure 9:
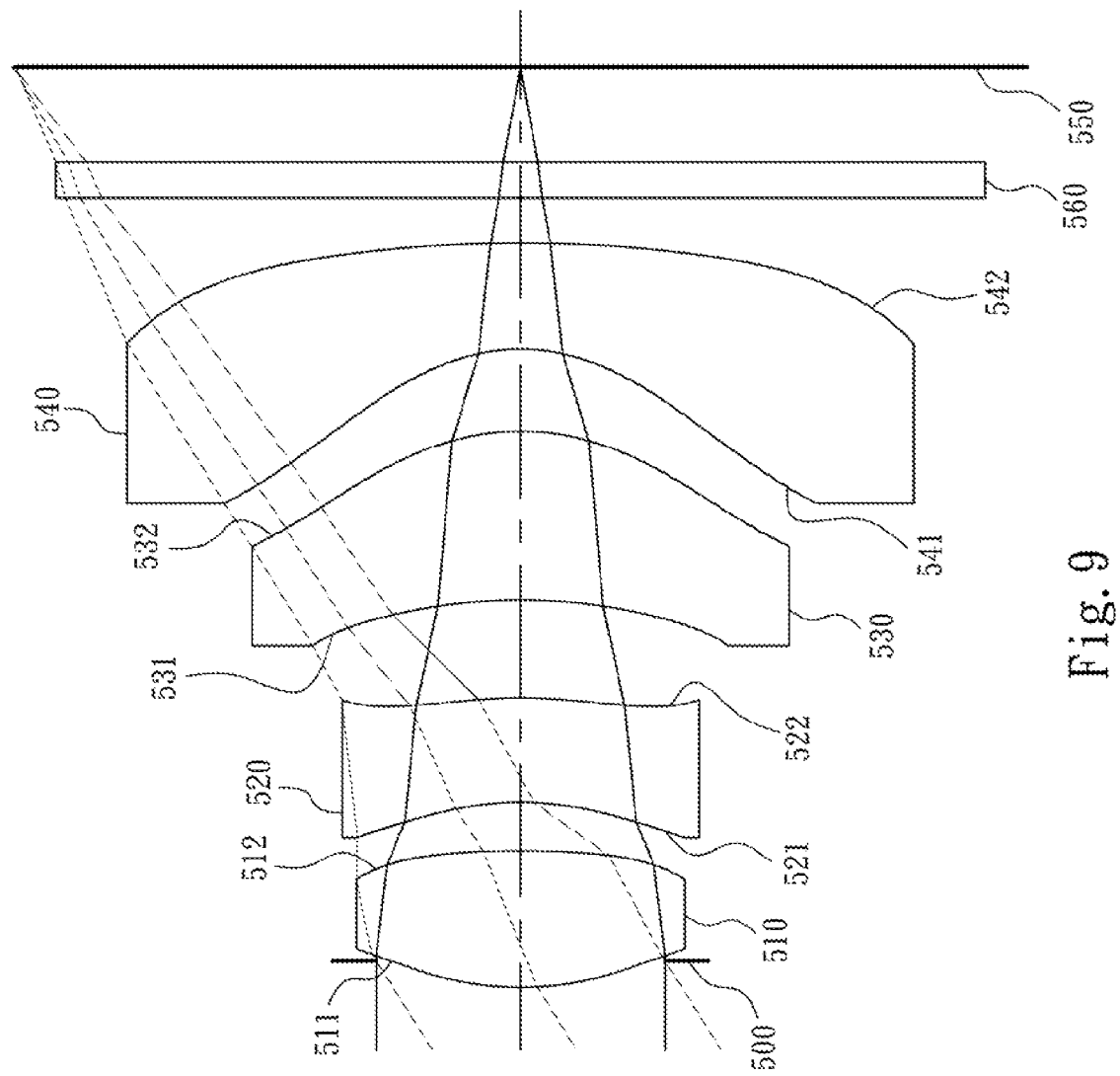
FIG. 9 is a schematic view of a photographing optical lens assembly according to the fifth embodiment.
Figure 10:
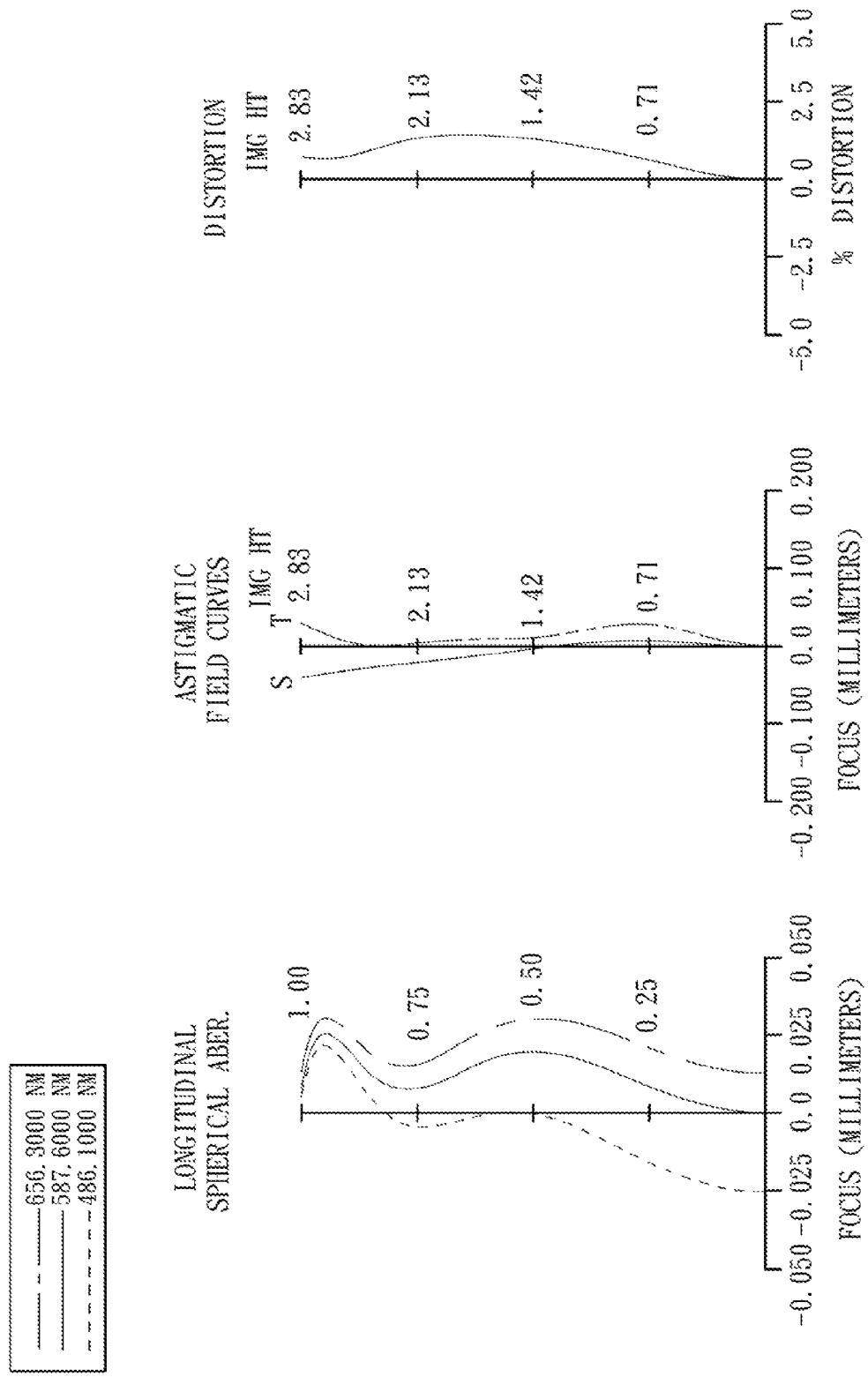
FIG. 10 shows spherical aberration curves, astigmatic field curves and distortion curve of the photographing optical lens assembly according to the fifth embodiment.

FIG. 9 is a schematic view of a photographing optical lens assembly according to the fifth embodiment. FIG. 10 shows spherical aberration curves, astigmatic field curves and distortion curve of the photographing optical lens assembly according to the fifth embodiment. In FIG. 9, the photographing optical lens assembly includes, in order from an object side to an image side, an aperture stop 500, the first lens element 510, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a convex image-side surface 512. The object-side surface 511 and the image-side surface 512 of the first lens element 510 are aspheric.

The second lens element 520 is made of plastic material. The second lens element 520 with negative refractive power has a concave object-side surface 521 and a convex image-side surface 522. The object-side surface 521 and the image-side surface 522 of the second lens element 520 are aspheric.

The third lens element 530 is made of plastic material. The third lens element 530 with positive refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with negative refractive power has a concave object-side surface 541 and a convex image-side surface 542. The object-side surface 541 and the image-side surface 542 of the fourth lens element 540 are aspheric.

The IR cut filter 560 is located between the fourth lens element 540 and the image plane 550 and will not affect the focal length of the photographing optical lens assembly.

The equation of the aspheric surface profiles of the above lens elements of the fifth embodiment is the same as that of the first embodiment, and will not be stated herein again.

In the photographing optical lens assembly according to the fifth embodiment, the definitions of f, Fno, HFOV, V1, V2, R1, R2, R3, R4, R5, R6, R7, f1, f2, f3, f4, SL, TTL and ImgH are the same as those stated in the first embodiment with corresponding values for the fifth embodiment, and they satisfy the following relationships:

| | |
|---|---|
| f(mm) | 4.52 |
| Fno | 2.77 |
| HFOV(degrees) | 32.1 |
| V1 − V2 | 32.4 |
| |R1/R2| | 0.33 |
| (R3 + R4)/(R3 − R4) | −4.26 |
| (R5 + R6)/(R5 − R6) | 2.75 |
| R7/f | −0.24 |
| f/f1 | 1.79 |
| f/f2 | −0.52 |
| f/f4 | −1.84 |
| f1/f3 | 0.65 |
| SL/TTL | 0.97 |
| TTL/ImgH | 1.79 |

The detailed optical data of the fifth embodiment are shown in Table 9, and the aspheric surface data are shown in Table 10 as follows.

TABLE 9

(Embodiment 5)
f = 4.52 mm, Fno = 2.77, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.150 | | | | |
| 2 | Lens 1 | 1.71915 (ASP) | 0.765 | Plastic | 1.530 | 55.8 | 2.53 |
| 3 | | −5.16090 (ASP) | 0.275 | | | | |
| 4 | Lens 2 | −1.60579 (ASP) | 0.584 | Plastic | 1.633 | 23.4 | −8.65 |
| 5 | | −2.59218 (ASP) | 0.545 | | | | |
| 6 | Lens 3 | −2.85726 (ASP) | 0.947 | Plastic | 1.530 | 55.8 | 3.88 |
| 7 | | −1.33230 (ASP) | 0.457 | | | | |
| 8 | Lens 4 | −1.05429 (ASP) | 0.597 | Plastic | 1.530 | 55.8 | −2.45 |
| 9 | | −6.66670 (ASP) | 0.250 | | | | |
| 10 | IR-filter | Plano | 0.200 | Glass | 1.517 | 64.2 | — |
| 11 | | Plano | 0.532 | | | | |
| 12 | Image | Plano | — | | | | |

Note:
Reference wavelength (d-line) is 587.6 nm

TABLE 10

| Aspheric Coefficients | | | | |
|---|---|---|---|---|
| Surface # | 2 | 3 | 4 | 5 |
| k= | −1.22662E+00 | 1.86985E+01 | −4.83781E−01 | −3.07792E−01 |
| A4= | 7.53799E−03 | −1.22580E−02 | 1.72199E−01 | 2.09123E−01 |
| A6= | −1.48679E−02 | −7.72569E−02 | −1.25500E−01 | −2.67370E−02 |
| A8= | 1.25447E−02 | −6.78044E−04 | 3.78962E−03 | −4.50920E−02 |
| A10= | −7.33564E−02 | −8.24030E−03 | 5.19620E−02 | 4.99567E−02 |
| A12= | 1.03921E−08 | 4.61621E−09 | 4.19962E−09 | −1.44310E−04 |
| Surface # | 6 | 7 | 8 | 9 |
| k= | −4.19740E+00 | −9.62356E−01 | −1.02242E+00 | −2.45105E+01 |
| A4= | 2.04678E−02 | 1.99227E−02 | 3.90959E−02 | 1.35058E−03 |
| A6= | −3.19618E−02 | −2.06540E−02 | 5.13696E−03 | −3.15742E−03 |
| A8= | 1.16976E−02 | 3.13039E−02 | 3.05525E−03 | −4.54961E−05 |
| A10= | −5.57894E−03 | −8.59278E−03 | −8.99808E−04 | 3.20009E−05 |
| A12= | −2.67326E−03 | 3.02977E−04 | −2.99391E−05 | −3.40265E−06 |

Figure 11:
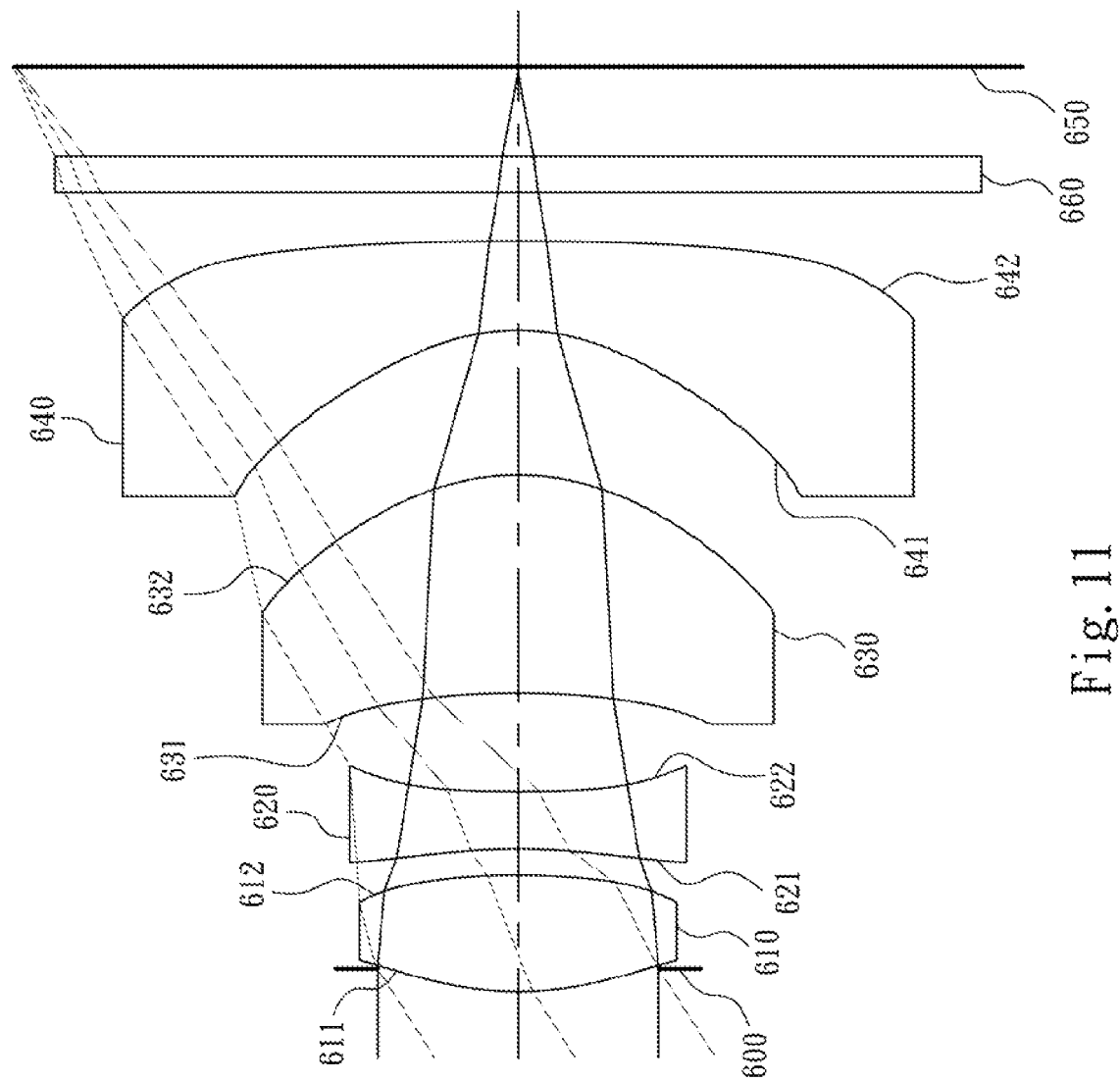
FIG. 11 is a schematic view of a photographing optical lens assembly according to the sixth embodiment.
Figure 12:
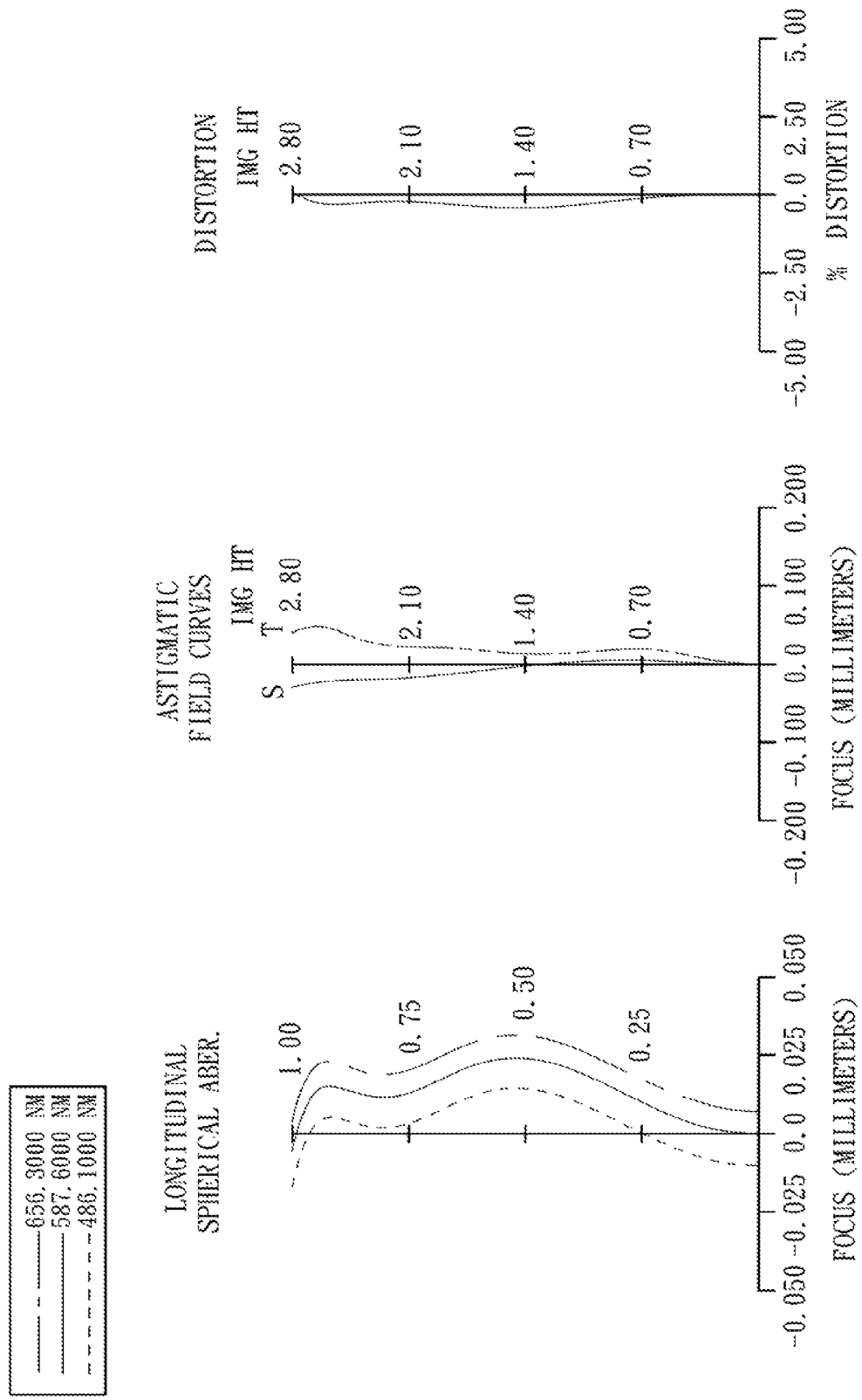
FIG. 12 shows spherical aberration curves, astigmatic field curves and distortion curve of the photographing optical lens assembly according to the sixth embodiment.

FIG. 11 is a schematic view of a photographing optical lens assembly according to the sixth embodiment. FIG. 12 shows spherical aberration curves, astigmatic field curves and distortion curve of the photographing optical lens assembly according to the sixth embodiment. In FIG. 11, the photographing optical lens assembly includes, in order from an object side to an image side, an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a concave object-side surface 621 and a concave image-side surface 622. The object-side surface 621 and the image-side surface 622 of the second lens element 620 are aspheric.

The third lens element 630 is made of plastic material. The third lens element 630 with positive refractive power has a concave object-side surface 631 and a convex image-side surface 632. The object-side surface 631 and the image-side surface 632 of the third lens element 630 are aspheric.

The fourth lens element 640 is made of plastic material. The fourth lens element 640 with negative refractive power has a concave object-side surface 641 and a convex image-side surface 642. The object-side surface 641 and the image-side surface 642 of the fourth lens element 640 are aspheric.

The IR cut filter 660 is located between the fourth lens element 640 and the image plane 650 and will not affect the focal length of the photographing optical lens assembly.

The equation of the aspheric surface profiles of the above lens elements of the sixth embodiment is the same as that of the first embodiment, and will not be stated herein again.

In the photographing optical lens assembly according to the sixth embodiment, the definitions of f, Fno, HFOV, V1, V2, R1, R2, R3, R4, R5, R6, R7, f1, f2, f3, f4, SL, TTL and ImgH are the same as those stated in the first embodiment with corresponding values for the sixth embodiment, and they satisfy the following relationships:

| | |
|---|---|
| f(mm) | 4.44 |
| Fno | 2.80 |
| HFOV(degrees) | 32.4 |
| V1 − V2 | 29.2 |
| |R1/R2| | 0.50 |
| (R3 + R4)/(R3 − R4) | −0.59 |
| (R5 + R6)/(R5 − R6) | 1.80 |
| R7/f | −0.27 |
| f/f1 | 1.82 |
| f/f2 | −1.14 |
| f/f4 | −1.83 |
| f1/f3 | 0.75 |
| SL/TTL | 0.97 |
| TTL/ImgH | 1.82 |

The detailed optical data of the sixth embodiment are shown in Table 11, and the aspheric surface data are shown in Table 12 as follows.

TABLE 11

(Embodiment 6)
f = 4.44 mm, Fno = 2.80, HFOV = 32.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.130 | | | | |
| 2 | Lens 1 | 1.86269 (ASP) | 0.650 | Plastic | 1.530 | 55.8 | 2.44 |
| 3 | | −3.70860 (ASP) | 0.146 | | | | |
| 4 | Lens 2 | −2.99375 (ASP) | 0.321 | Plastic | 1.607 | 26.6 | −3.90 |
| 5 | | 11.74030 (ASP) | 0.552 | | | | |
| 6 | Lens 3 | −4.84030 (ASP) | 1.213 | Plastic | 1.530 | 55.8 | 3.25 |
| 7 | | −1.38100 (ASP) | 0.809 | | | | |
| 8 | Lens 4 | −1.19582 (ASP) | 0.500 | Plastic | 1.530 | 55.8 | −2.42 |
| 9 | | −20.60840 (ASP) | 0.270 | | | | |
| 10 | IR-filter | Plano | 0.200 | Glass | 1.517 | 64.2 | — |
| 11 | | Plano | 0.499 | | | | |
| 12 | Image | Plano | — | | | | |

Note:
Reference wavelength (d-line) is 587.6 nm

TABLE 12

Aspheric Coefficients

| Surface # | 2 | 3 | 4 | 5 |
|---|---|---|---|---|
| k= | −1.53420E+00 | 8.69010E+00 | −1.10323E−00 | −1.00000E+00 |
| A4= | 9.39422E−04 | 2.65229E−02 | 1.74002E−01 | 1.81391E−01 |
| A6= | −2.78589E−02 | −6.99387E−02 | −1.21563E−01 | −5.33399E−02 |
| A8= | 1.71663E−02 | −1.62359E−02 | −4.47741E−02 | −2.62723E−02 |
| A10= | −9.16338E−02 | −1.14568E−02 | 8.26586E−02 | 3.58908E−02 |

TABLE 12-continued

| Aspheric Coefficients | | | | |
|---|---|---|---|---|
| A12= | 2.23982E−08 | 4.11322E−08 | 4.44318E−08 | −5.79122E−05 |
| Surface # | 6 | 7 | 8 | 9 |
| k= | 6.24189E+00 | −8.47535E−01 | −1.24548E+00 | 4.22921E+01 |
| A4= | −3.77298E−02 | 1.51462E−02 | 4.48918E−02 | −4.77539E−03 |
| A6= | 1.79583E−02 | −1.87036E−02 | −1.16186E−02 | 1.25477E−03 |
| A8= | 1.66330E−02 | 2.37968E−02 | 3.24722E−03 | −5.19323E−04 |
| A10= | −2.59018E−02 | −9.50704E−03 | −1.36317E−03 | −7.62940E−05 |
| A12= | 7.01871E−04 | 2.86247E−04 | −2.85950E−04 | 1.27792E−05 |

According to the aforementioned embodiments of the present invention, aberration of the photographing optical lens assembly can be corrected and photosensitivity of the photographing optical lens assembly can be effectively reduced while high image quality is retained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens assembly comprising, in order from an object side to an image side:

a first lens element with positive refractive power having a convex object-side surface;

a second lens element with negative refractive power, wherein at least one of an object-side surface and an image-side surface of the second lens element is aspheric;

a third lens element with positive refractive power having a concave object-side surface and a convex image-side surface, wherein the third lens element has at least one aspheric surface; and a fourth lens element with negative refractive power having a concave object-side surface and made of plastic material, wherein the object-side surface and an image-side surface of the fourth lens element are aspheric, and the fourth lens element has at least one inflection point formed on at least one of the object-side surface and the image-side surface thereof;

wherein the photographing optical lens assembly has four lens elements with refractive power, a radius of curvature of the object-side surface of the fourth lens element is R7, a focal length of the photographing optical lens assembly is f, a focal length of the first lens element is f1, a focal length of the third lens element is f3, a radius of curvature of the object-side surface of the second lens element is R3, a radius of curvature of the mage-side surface of the second lens element is R4, and the photographing optical lens assembly further comprises an aperture stop which is located between an imaged object and the first lens element, wherein a distance on the optical axis between the aperture stop and an image plane is SL, a distance on the optical axis between the object-side surface of the first lens element and the image plane is TTL, a focal length of the fourth lens element is f4, and they satisfy the following relationships:

$-0.5 < R7/f < 0$;

$0.5 < f1/f3 < 1.05$;

$-3.3 < (R3+R4)/(R3-R4) < -0.7$;

$0.92 < SL/TTL < 1.1$;

$1.3 < f/f1 < 2.2$; and $-2.5 < f/f4 < -1.5$.

2. The photographing optical lens assembly of claim 1, wherein radius of curvature of the object-side surface of the first lens element is R1, a radius of curvature of the image-side surface of the first lens element is R2, and they satisfy the following relationship:

$0 < |R1/R2| < 0.55$.

3. The photographing optical lens assembly of claim 2, wherein a radius of curvature of the object-side surface of the third lens element is R5, a radius of curvature of the mage-side surface of the third lens element is R6, and they satisfy the following relationship:

$1.1 < (R5+R6)/(R5-R6) < 5.0$.

4. The photographing optical lens assembly of claim 2, wherein the radius of curvature of the object-side surface of the fourth lens element is R7, the focal length of the photographing optical lens assembly is f, and they satisfy the following relationship:

$-0.4 < R7/f < -0.17$.

5. The photographing optical lens assembly of claim 1, wherein the Abbe number of the first lens element is V1, the Abbe number of the second lens element is V2, and they satisfy the following relationship:

$29 < V1-V2 < 42$.

6. The photographing optical lens assembly of claim 1, wherein the focal length of the first lens element is f1, and the focal length of the third lens element is f3, and they satisfy the following relationship:

$0.7 < f1/f3 < 1.0$.

7. The photographing optical lens assembly of claim 1, wherein the focal length of the photographing optical lens assembly is f, and a focal length of the second lens element is f2, and they satisfy the following relationship:

$-0.75 < f/f2 < -0.4$.

8. The photographing optical lens assembly of claim 1, wherein the radius of curvature of the object-side surface of the first lens element is R1, and the radius of curvature of the image-side surface of the first lens element is R2, and they satisfy the following relationship:

$0 < |R1/R2| < 0.35$.

9. The photographing optical lens assembly of claim 1, further comprising:

an image sensor located on the image plane, wherein a half of a diagonal length of an effective sensing area of the image sensor is ImgH, and the distance on the optical axis between the object-side surface of the first lens element and the image plane is TTL, and they satisfy the following relationship:

$TTL/ImgH<1.95.$

10. A photographing optical lens assembly comprising, in order from an object side to an image side:

a first lens element with positive refractive power having a convex object-side surface;

a second lens element with negative refractive power having a concave object-side surface, wherein the second lens element has at least one inflection point on at least one of the object-side surface and an image-side surface thereof;

a third lens element with positive refractive power having a concave object-side surface and a convex image-side surface, wherein the third lens element is made of plastic material; and a fourth lens element with negative refractive power having a concave object-side surface and a convex image-side surface, wherein the object-side surface and the image-side surface of the fourth lens element are aspheric, the fourth lens element is made of plastic material, and at least one inflection point is formed on at least one of the object-side surface and the image-side surface of the fourth lens element;

wherein the photographing optical lens assembly has four lens elements with refractive power, a radius of curvature the object-side surface of the fourth lens element is R7, a focal length of the photographing optical lens assembly is f, a focal length of the first lens element is f1, a focal length of the third lens element is f3, a radius of curvature of the object-side surface of the third lens element is R5, a radius of curvature of the image-side surface of the third lens element is R6, and the photographing optical lens assembly further comprises an aperture stop, wherein a distance on the optical axis between the aperture stop and an image plane is SL, a distance on the optical axis between the object-side surface of the first lens element and the image plane is TTL, a focal length of the fourth lens element is f4, a radius of curvature of the object-side surface of the second lens element is R3, a radius of curvature of the image-side surface of the second lens element is R4, and they satisfy the following relationships:

$-1.0<R7/f<0;$ $0.5<f1/f3<1.05;$ $-1.1<(R5+R6)/(R5-R6)<5;$ $0.77<SL/TTL<1.1;$ $-2.5<f/f4<-1.5;$ and $-3.3<(R3+R4)/(R3-R4)<-0.7.$ 11. The photographing optical lens assembly of claim 10, wherein the radius of curvature of the object-side surface of the fourth lens element is R7, the focal length of the photographing optical lens assembly is f, and they satisfy the following relationship:

$-0.4<R7/f<-0.17.$

12. The photographing optical lens assembly of claim 10, wherein the aperture stop is located between the imaged object and the first lens element, the distance on the optical axis between the aperture stop and the mage plane is SL, the distance on the optical axis between the object-side surface of the first lens element and the image plane is TTL, and they satisfy the following relationship:

$0.92<SL/TTL<1.1.$

13. The photographing optical lens assembly of claim 12, wherein the focal length of the first lens element is f1, the focal length of the third lens element is f3, and they satisfy the lowing relationship:

$0.7<f1/f3<1.0.$

* * * * *

UNITED STATES PATENT AND TRADEMARK OFFICE
CERTIFICATE OF CORRECTION

| | | |
|---|---|---|
| PATENT NO. | : 8,503,108 B2 | Page 1 of 1 |
| APPLICATION NO. | : 13/075194 | |
| DATED | : August 6, 2013 | |
| INVENTOR(S) | : Hsin-Hsuan Huang | |

It is certified that error appears in the above-identified patent and that said Letters Patent is hereby corrected as shown below:

In the Claims

The relationship appearing in column 24, line 14, claim 10 of the issued patent should be changed to the relationship as follows:

$1.1 < (R5+R6)/(R5-R6) < 5.$

Signed and Sealed this
Twenty-fourth Day of June, 2014

Michelle K. Lee
*Deputy Director of the United States Patent and Trademark Office*